Feb. 15, 1966    P. TENENBAUM ETAL    3,235,285
VEHICLE WITH MEANS TO RAISE THE REAR THEREOF
Filed Jan. 28, 1964    4 Sheets-Sheet 2

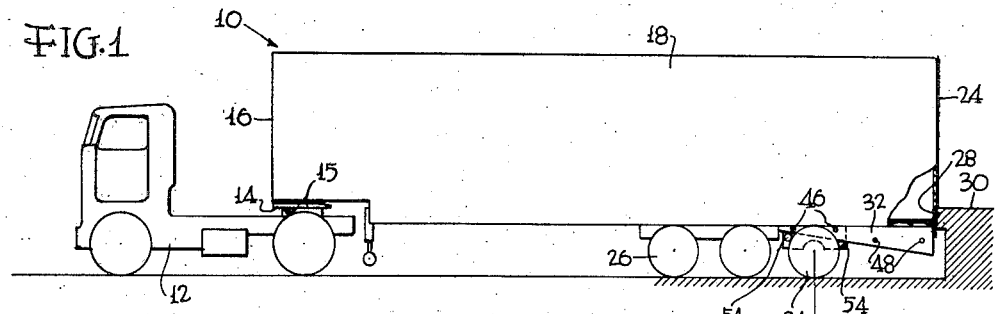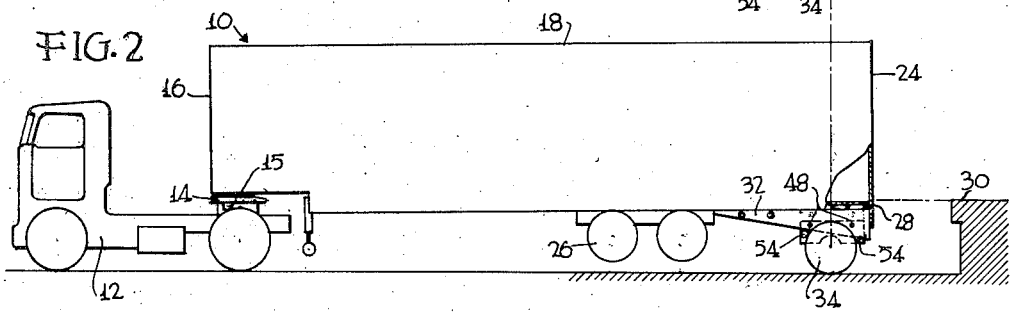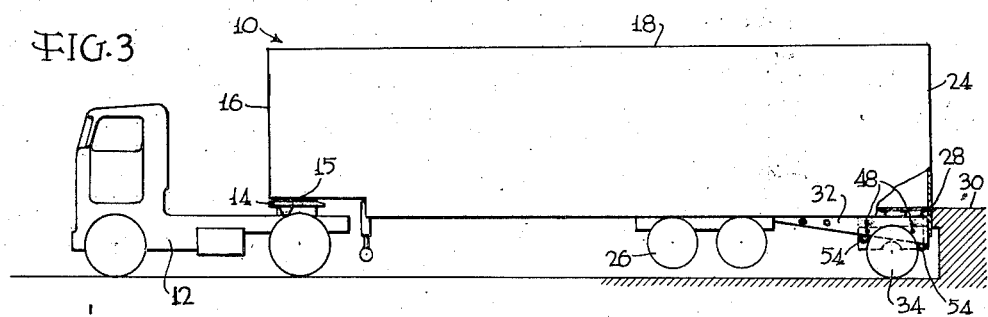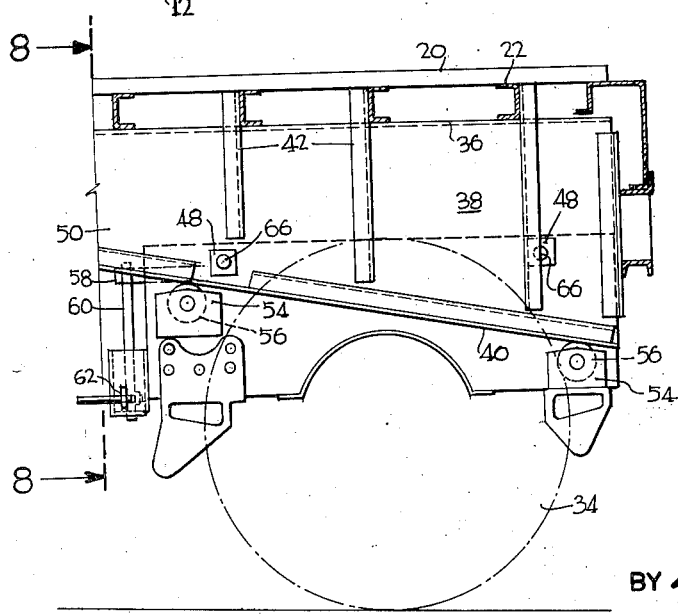

INVENTORS.
PAUL TENENBAUM
FRANK LEBRIZZI
BY Millman and Jacobs
ATTORNEYS

Feb. 15, 1966 P. TENENBAUM ETAL 3,235,285
VEHICLE WITH MEANS TO RAISE THE REAR THEREOF
Filed Jan. 28, 1964 4 Sheets-Sheet 4

INVENTORS.
PAUL TENENBAUM
FRANK LEBRIZZI

BY *Millman and Jacobs*
ATTORNEYS

United States Patent Office 3,235,285
Patented Feb. 15, 1966

3,235,285
VEHICLE WITH MEANS TO RAISE THE
REAR THEREOF
Paul Tenenbaum, Glenside, and Frank Lebrizzi, Levittown, Pa., assignors to Strick Trailers, a Division of Fruehauf Corporation, Philadelphia, Pa., a corporation of Michigan
Filed Jan. 28, 1964, Ser. No. 340,660
7 Claims. (Cl. 280—423)

This invention relates to an over-the-road vehicle and more particularly a semi-trailer.

To increase pay loads, truckers and van lines are desirous of increasing the cubage of their trailer bodies. Since the maximum length, width and height above the ground are fixed by State laws, the cubage of the body is generally increased by lowering the floor which frequently means the utilization of rear tandem wheels whose diameters are less than those conventionally employed and less than those of the tractor. The result is that the rear portion of the trailer body is lower than usual and frequently below the height of a loading dock. This limits the utility of such trailers since the loading and unloading of the trailer bodies from an elevated dock is difficult and time consuming, sometimes requiring the use of inclined planes and other handling equipment.

The primary object of the invention is to provide a trailer body of increased cubage with an easily operable built-in means to raise the rear of the body to dock height avoiding the disadvantages mentioned above of attempting to load and unload the body from an elevated dock or platform.

Another object of the invention is to provide a trailer body with a means adjacent its rear end including inclined ramps coacting with a detachable slide bogie whereby the rear of the body is elevated by relative movement between the body and the bogie.

Another object of the invention is to provide a trailer body with a means adjacent its rear end including inclined ramps coacting with a detachable slide bogie whereby the rear of the body is elevated by relative movement between the body and the bogie, the bogie including rollers to engage the inclined ramps and thereby decrease friction between the bogie and the inclined ramps during said relative movement.

Another object of the invention is to provide a trailer body with a means adjacent its rear end including inclined ramps coacting with a detachable slide bogie whereby the rear of the body is elevated by relative movement between the body and the bogie, the bogie including rollers to engage the inclined ramps and thereby decrease function between the bogie and the inclined ramps during said relative movement, the bogie including a frame and the rollers being carried thereby in such positions that when the bogie is locked in the lowered position of the body, the latter rests on the bogie frame and when the bogie is locked in the raised position of the body, the rollers engage the inclined ramps.

Another object of the invention is to provide a trailer body with a means adjacent its rear end including inclined ramps coacting with a detachable slide bogie whereby the rear of the body is elevated by relative movement between the body and the bogie, the inclined ramps being spaced plates depending from the body and the bogie including a frame which is slidably coupled to said plate and is disposed between them.

These and other objects of the invention will become more apparent as the following description proceeds in conjunction with the accompanying drawings, wherein:

FIG. 1 is a diagrammatic view of the instant vehicle shown in the lowered or road position;

FIG. 2 is a view similar to FIG. 1 showing the rear of the vehicle elevated to dock height but spaced therefrom;

FIG. 3 is a view similar to FIG. 2 showing the vehicle in position for loading or unloading adjacent the dock;

FIG. 7 is a fragmentary enlarged side elevational view of the rear of the vehicle showing the bogie coupled thereto in the final elevated position of the rear of the vehicle.

Specific reference is now made to the drawings wherein similar reference characters are used for corresponding elements throughout.

Figure 4:
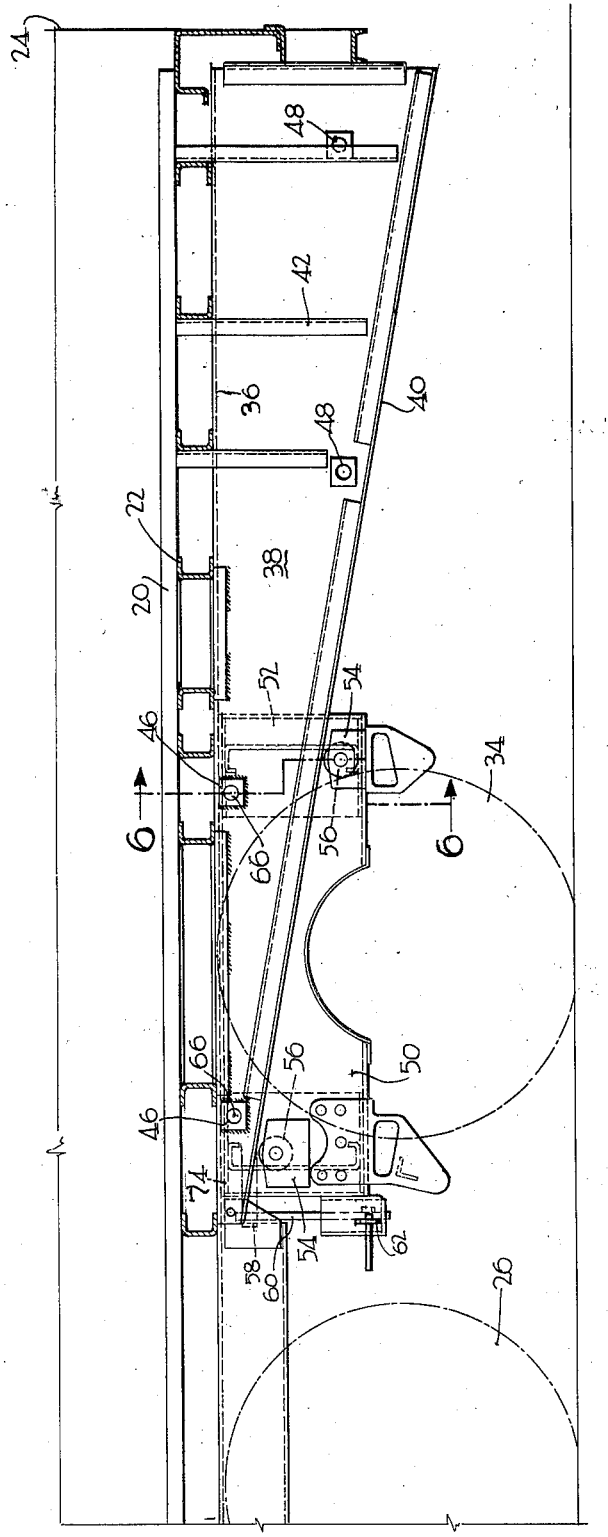
FIG. 4 is a fragmentary enlarged longitudinal sectional view through the rear portion of the body and showing the bogie coupled thereto in the road position.

The vehicle of the instant invention is indicated at 10 and comprises a conventional tractor 12 having a fifth wheel 14 which is coupled to the king pin 15 beneath the front end 16 of a body 18 having side and end walls, a roof and a floor 20 supported upon longitudinally spaced cross members or sills 22. The fifth wheel is conventional and includes a means to permit vertical pivoting of the front end of the body about an axis transversely through the king pin. Spaced forwardly at a predetermined distance from the rear 24 of the body and secured to the cross members 22 is a double-axle wheeled or tandem unit 26. Although here shown as fixedly secured to the body, it will be understood that the tandem unit, if desired, can be slidably and detachably coupled to the body by means such as that shown in the Sheppard et al. Patent No. 2,841,411. Inasmuch as truckers desire trailer bodies of increased cubage to accommodate greater pay loads, and the maximum height above ground is generally fixed by State laws, the floor 20 must be lowered which also requires, as a rule, that the diameters of the tandem wheels 26 are less than those of the tractor wheels. The result is that the lower edge 28 of the rear of the trailer is below the height of a loading dock 30 thereby creating difficulties in loading and unloading the body and requiring the use of inclined planes and special equipment in the dock itself.

In the instant invention an easily operable, structurally sound means is built into the vehicle to permit the rear thereof to be raised to dock height when required. This means includes ramp members 32 depending from the body and disposed between the tandem unit 26 and the rear 24 and a further single axle wheeled unit or bogie 34 which is slidably and detachably coupled to the body so that when relative movement between the body and bogie is effected and the body is driven in a forward position, as shown in FIG. 2, the bogie coacts with the ramp members to lift the rear of the body as the front rocks around the transverse axis through its king pin 15 and the tandem unit leaves the ground. In the final position of the bogie 34 as shown in FIGS. 2 and 3 the rear edge 28 attains the dock height and the vehicle is supported solely on the tractor and bogie wheels.

Figure 8:
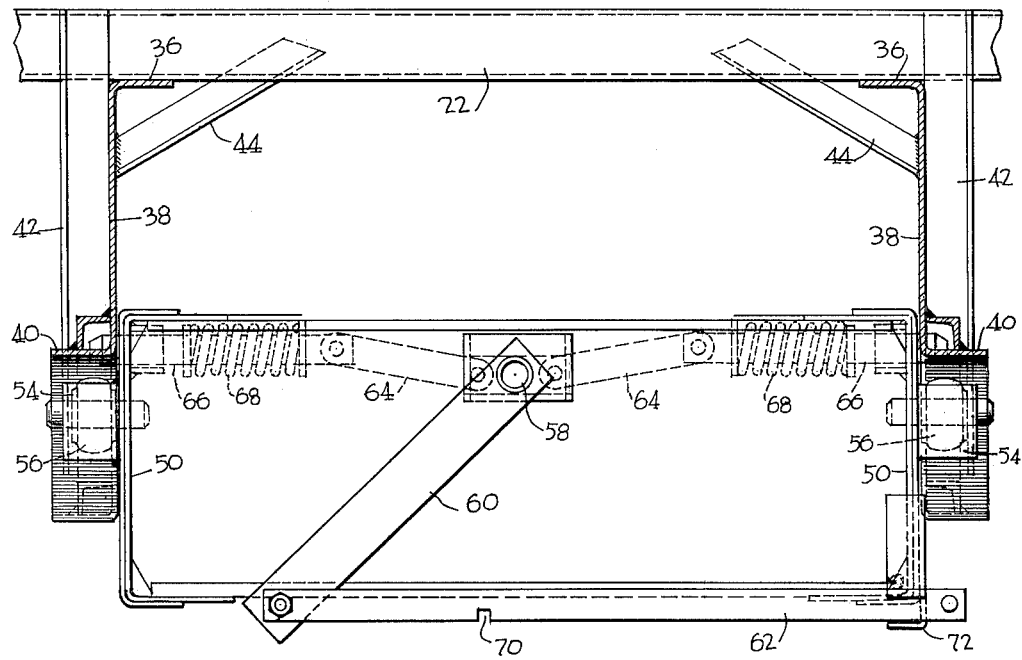
FIG. 8 is an elevational view looking from the line 8—8 of FIG. 7.

As seen more clearly in FIGS. 4–8, the ramp members 32 consist of a pair of longitudinally extending transversely spaced plates of substantial Z cross-section having inwardly extending upper flanges 36 which abut the undersurfaces of the cross members 22, triangular webs 38 and outwardly extending lower flanges 40. The webs 38 are essentially right triangles whose hypotenuses contain the lower flanges 40 and which are downwardly and rearwardly inclined as clearly seen in the drawings. The ramp plates are welded, bolted or otherwise secured to the cross sills by vertical hangers 42 for lateral stiffening of the webs 38 and by diagonal braces 44 connecting the upper ends of the webs to the cross sills as seen in FIG. 8. Adjacent their forward ends and their upper flanges 36, the webs 38 are provided with horizontally aligned pairs of spaced apertures 46 and with a further pair of spaced apertures 48 adjacent their rear ends and their lower flanges 40.

Figure 5:
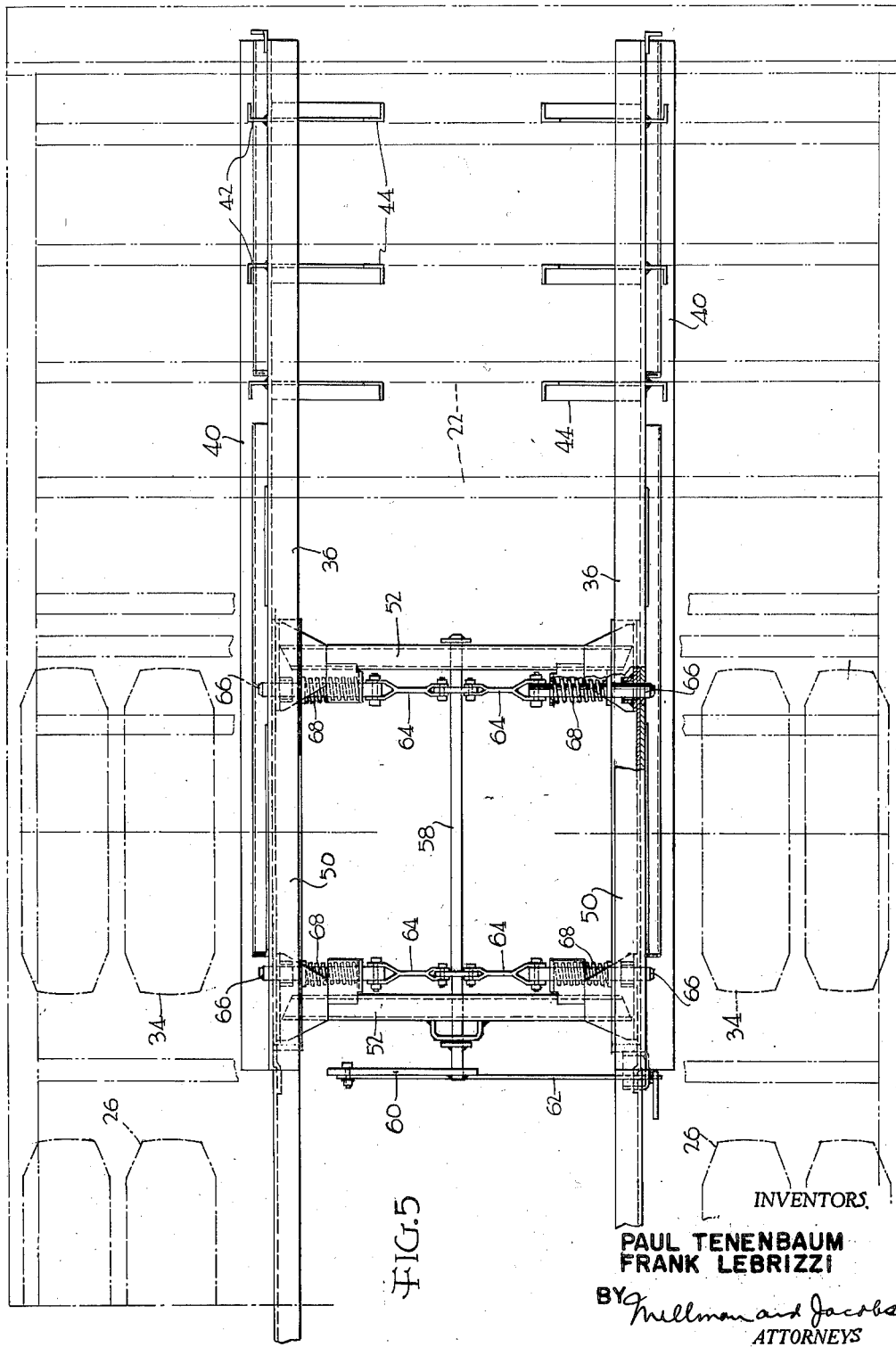
FIG. 5 is a bottom plan view looking from above on FIG. 4.
Figure 6:
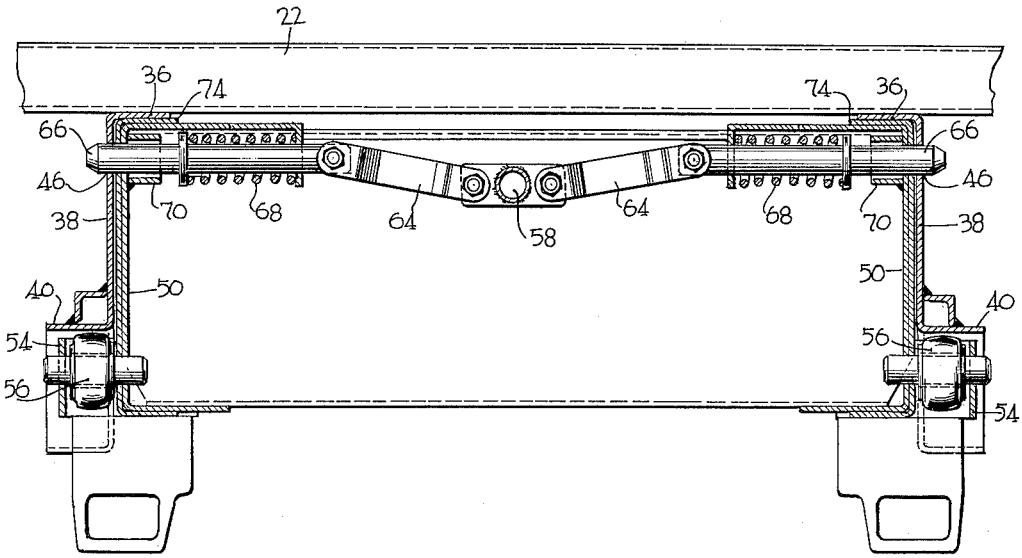
FIG. 6 is a sectional view taken on the line 6—6 of FIG. 4.

The bogie 34 includes a frame from which the wheels and axle are suspended, the frame including interconnected longitudinal and transverse members 50 and 52, see FIG. 5. The frame is disposed between the inner faces of the ramp member webs 38. Mounted by suitable brackets 54 on the outside of the longitudinal frame members 50 for rotation in a vertical plane are rollers 56 which are spaced from each other and whose centers of rotation lie in a line of inclination parallel to that of the lower flanges 40.

A means is provided for detachably coupling the bogie to body which can take several forms. As illustrated, this consists of a longitudinal shaft 58 journaled on the transverse frame members 52 and terminating at one end in a link 60 which is pivoted to a slide handle 62. Pairs of links 64 are terminally pivoted to the shaft 58 and to coupler rods 66 which are normally urged by springs 68 outwardly through bosses 70 carried by the longitudinal frame members 50 and through the selected pairs of apertures 46, 46 and 48, 48 in the webs 38 of the ramp members. When the handle 62 is pulled to the right of FIG. 8, the coupler rods 66 are retracted and are retained in such position by a suitable releasable latch, such as the notch 70 in the handle engaging a keeper 72. In this position, relative movement of the body and bogie may be effected and when the latch is released, the couplers will re-engage in the next set of apertures 46, 46 or 48, 48. While a manual release or latch mechanism is shown herein, it will be understood that the bogie may be provided with an indexed automatic release mechanism as shown and described in the Sheppard et al. Patent No. 2,841,411.

When the couplers 66 engage in the first set of apertures 46 in the ramp members, that is the forward apertures, the bogie is coupled to the body in its lowered or road position as seen in FIG. 1. In this position the tandem and bogie wheels are in ground engagement but the rollers 56 do not contact the lower ramp flanges 40 as seen in FIG. 4. Thus in the road position the rollers do not apply a stress upon these flanges. Instead, the upper flanges 36 of the ramp members 32 contact and bear upon the upper flanges 74 of the longitudinal bogie frame members 50. To raise the rear end of the body, the operator applies the brakes to the tandem and bogie axles, retracts the coupler pins 66 from the apertures 46 and locks them by the latch mechanism 70, 72, then releases the brakes only on the tandem unit 26 and drives forward several inches to be sure that the couplers are actually retracted from the holes 46. He then sets the hand brake, releases the latch mechanism, gets back into the tractor, releases the hand brake and continues to drive forward until the couplers 66 are urged by their springs 68 into the holes 48 at the rear of the ramp members, as seen in FIGS. 2 and 7. For a short distance when the body is moving forward relative to the bogie there is sliding friction between the body and the bogie frame, then the rollers 56 engage the lower ramp flanges 40 and rolling friction occurs for the major length of relative movement until the bogie reaches the rear end of the body in its final elevated position, as seen in FIG. 2. In this position the body rests on the rollers and only on the tractor and bogie 34 with the tandem unit elevated above ground level. The vehicle is then backed up until its rear end is adjacent the dock 30 as seen in FIG. 3. To convert from elevated to road position, the foregoing procedure is reversed.

While a preferred embodiment has here been shown and described, skilled artisans may make variations without departing from the spirit of the invention and the scope of the appended claims.

We claim:

1. A vehicle including a body, a tractor coupled to the front thereof, a wheeled unit secured to said body adjacent its rear and means including a bogie movable relative to said body and responsive to the forward movement of the vehicle acting to raise the rear of said body a predetermined distance, said means including a ramp member carried by said body between said wheeled unit and the rear of said body and inclined downwardly towards the rear, said bogie including a frame and wheels mounted thereon, retractable couplers carried by said bogie frame, means adjacent said wheeled unit and adjacent the rear of the body to removably receive said couplers and selectively retain said bogie in the road position and fully elevated position of said body, and means carried by said bogie frame and engageable with said ramp member to elevate the rear of the vehicle, said bogie frame being in contact with said body and said means engageable with said ramp member being out of contact with said ramp member at the road position where said couplers are received in said means adjacent said wheeled unit, said means engageable with said ramp member being in contact with said ramp member at the fully elevated position of the rear of said body where said couplers are received in said means adjacent the rear of said body.

2. The combination of claim 1 wherein said means engageable with said ramp member contacts said ramp member and begins to elevate the rear of the body at a predetermined distance in advance of the fully elevated position of the rear of the body.

3. A vehicle including a body, a tractor coupled to the front thereof, a wheeled unit secured to said body adjacent its rear and means including a bogie movable relative to said body and responsive to the forward movement of the vehicle acting to raise the rear of said body a predetermined distance, said means including a ramp member carried by said body between said wheeled unit and the rear of said body and inclined downwardly towards the rear, said bogie including a frame and wheels mounted thereon, retractable couplers carried by said bogie frame, means adjacent said wheeled unit and adjacent the rear of the body to removably receive said couplers and selectively retain said bogie in the road position and fully elevated position of said body, rollers carried by said body, said bogie frame contacting said body and said rollers being out of engagement with said ramp member at the road position where said couplers are received in said means adjacent said wheeled unit, said rollers engaging said ramp member when said bogie has been uncoupled and said body is moved relative thereto, said rollers thereby acting to raise the rear of said body until the fully elevated position is attained where said couplers are received in said means adjacent the rear of said body.

4. The combination of claim 3 wherein said ramp member includes a pair of transversely spaced, longitudinally extending plates of substantially Z cross section depending from said body, each plate including an upper inwardly extending flange, a lower outwardly extending flange and a triangular web portion therebetween, said rollers being engageable with said lower flanges.

5. The combination of claim 4 wherein said bogie frame is disposed slidably between said web portions of said plates.

6. A vehicle body having a front adapted for coupling to a tractor and a rear, a pair of spaced ramp plates depending from said body extending to the rear thereof, each of said plates being of substantially Z-cross section and including a lower outwardly extending flange having a surface inclined downwardly toward the rear of the body, an upper inwardly extending flange and a web portion therebetween, a bogie including a frame and a wheeled axle suspended therefrom, the bogie frame extending between said web portions of said plates, means to slidably and removably couple the bogie frame to the body adjacent the front and rear ends of the ramp plates and rollers carried by the bogie frame and engageable wth the inclined surfaces of the lower flanges of the ramp plates to elevate the rear of the body when the bogie is uncoupled from the body and the latter is moved forwardly relative to the bogie.

7. A vehicle body having a front adapted for coupling to a tractor and a rear, a pair of spaced ramp plates depending from said body extending to the rear thereof, each of said plates being of substantially Z-cross section and including a lower outwardly extending flange having a surface inclined downwardly toward the rear of the body an upper inwardly extending flange and a web portion therebetween, a bogie including a frame and a wheeled axle suspended therefrom, the bogie frame extending between said web portions of said plates, means to slidably and removably couple the bogie frame to the body adjacent the front and rear ends of the ramp plates and rollers carried by the bogie frame and engageable with the inclined surfaces of the lower flanges of the ramp plates to elevate the rear of the body when the bogie is uncoupled from the body and the latter is moved forwardly relative to the bogie, the rollers being so positioned on the bogie frame that when the latter is coupled to the body adjacent the front ends of the ramp plates, the body sits on the bogie frame and the rollers do not engage the inclined ramp surfaces.

References Cited by the Examiner
UNITED STATES PATENTS

| | | | |
|---|---|---|---|
| 1,175,545 | 3/1916 | Morgan | 214—38 |
| 1,896,883 | 2/1933 | Callison | 214—38 |
| 2,717,707 | 2/1955 | Martin | 280—80 |
| 2,753,064 | 7/1956 | Lesser | 214—506 |
| 3,004,772 | 10/1961 | Bohlen et al. | |
| 3,085,816 | 4/1963 | Tantlinger et al. | 280—81 |
| 3,102,738 | 9/1963 | Roshia | 280—81 |
| 3,112,100 | 11/1963 | Prichard. | |

FOREIGN PATENTS

| | | |
|---|---|---|
| 571,325 | 7/1958 | Italy. |
| 964,833 | 5/1957 | Germany. |

BENJAMIN HERSH, *Primary Examiner.*

KENNETH H. BETTS, *Examiner.*